United States Patent [19]

Ko et al.

[11] Patent Number: 5,663,537

[45] Date of Patent: Sep. 2, 1997

[54] ASSEMBLY OF AN EXHAUST PIPE UNIT AND A MUFFLING DEVICE

[76] Inventors: Tse-Hao Ko, 3F, No. 18, Lane 5, Lung-Chuan St., Ta-An Dist., Taipei City; Wen-Pin Yeh, No. 31, Yung-Fu St., Yung-Fu Li, Chang-Hua City, both of Taiwan

[21] Appl. No.: 442,192

[22] Filed: May 16, 1995

[51] Int. Cl.⁶ ................................................. F01N 7/08
[52] U.S. Cl. ......................... 181/228; 181/249; 181/272; 55/276
[58] Field of Search ............................. 181/227, 228, 181/249, 252, 256, 258, 272; 55/276, DIG. 30, 482, 484, 485, 525, 527

[56] References Cited

U.S. PATENT DOCUMENTS

| | | | |
|---|---|---|---|
| 2,984,315 | 5/1961 | Kleinecke | 181/252 |
| 3,147,097 | 9/1964 | Aguas | 181/252 |
| 3,159,237 | 12/1964 | Thomas | 181/252 |
| 4,419,113 | 12/1983 | Smith | 55/484 |
| 5,135,551 | 8/1992 | Fielding | 55/DIG. 30 |
| 5,266,755 | 11/1993 | Chien | 181/252 |

*Primary Examiner*—Khanh Dang
*Attorney, Agent, or Firm*—Ladas & Parry

[57] ABSTRACT

An assembly includes an exhaust pipe unit and a muffling device. The exhaust pipe unit has at least one gas expanding section. The muffling device includes a muffler unit installed on the gas expanding section of the exhaust pipe unit. The muffler unit has an outer housing surrounding the gas expanding section of the exhaust pipe unit so as to define a gas expanding space in the outer housing, in such a manner that the gas expanding space is communicated with an interior of the exhaust pipe unit. The muffler unit includes a filtering material received within the gas expanding space of the muffler unit so as to filter exhaust gas which flows through the gas expanding space.

9 Claims, 8 Drawing Sheets

5,663,537

ASSEMBLY OF AN EXHAUST PIPE UNIT AND A MUFFLING DEVICE

BACKGROUND OF THE INVENTION

1. Field of the Invention

This invention relates to an assembly of an exhaust pipe unit and a muffling device, more particularly to an assembly in which the muffling device has filtering ability.

2. Description of the Related Art

Referring to FIG. 1, a conventional assembly 1 of an exhaust pipe unit and a muffler is used in an automobile. Although the muffler can reduce noise generated in the pipe unit, exhaust gas removing from the pipe unit contains various harmful substances and dirty substances which create air pollution and which accumulate in the pipe unit, thereby reducing the exhaust-gas discharge efficiency of the assembly 1.

SUMMARY OF THE INVENTION

An object of this invention is to provide a muffler with a filtering material whereby the exhaust gas can be discharged effectively and rapidly from the associated exhaust pipe.

Another object of this invention is to provide an exhaust pipe with a tailpipe unit wherein the exhaust gas can expand and mix with air flowing from environment so as to dilute the exhaust gas, thereby cooling the exhaust gas before the exhaust gas is discharged from the tailpipe to the atmosphere and preventing unexpected substances from accumulation in the tailpipe.

According to this invention, an assembly includes an exhaust pipe unit and a muffling device. The exhaust pipe unit has at least one gas expanding section. The muffling device includes a muffler unit installed on the gas expanding section of the exhaust pipe unit. The muffler unit has an outer housing surrounding the gas expanding section of the exhaust pipe unit so as to define a gas expanding space in the outer housing, in such a manner that the gas expanding space is communicated with an interior of the exhaust pipe unit. The muffler unit includes a filtering material received within the gas expanding space of the muffler unit so as to filter exhaust gas which flows through the gas expanding space. A tailpipe unit includes an inner pipe and an outer pipe. The inner pipe has a sleeve portion coupled with the tail end of the exhaust pipe unit, a porous large-diameter pipe section coupled with the rear end of the sleeve portion, and a porous small-diameter pipe section coupled with the rear end of the large-diameter pipe section and having an open rear end. A front positioning plate is sleeved fixedly on the large-diameter pipe section, while a rear positioning plate on the small-diameter pipe section, so as to be press fitted within the outer pipe. The outer pipe has an outwardly diverging front end portion facilitating insertion of the inner pipe into the outer pipe, and an outwardly converging rear end portion with a minimum inner diameter smaller than the outer diameter of the rear end of the inner pipe so as to prevent the inner pipe from movement through the rear end portion of the outer pipe. A plurality of air inlets are formed through a wall of the outer pipe near the front end portion of the outer pipe. A plurality of mixed-gas outlets are formed through a wall of the outer pipe near the rear end portion of the outer pipe. Air can enter the space between the inner and outer pipes through the air inlets of the outer pipe and the openings of the front positioning ring. Exhaust gas can expand into the space between the inner and outer pipes through the openings which are formed through a wall of the inner pipe, to mix with air. The mixed gas can flow from the outer pipe into the atmosphere through the mixed-gas outlets of the outer pipe. The remaining exhaust gas in the small-diameter pipe section of the inner pipe can be discharged therefrom through the rear end of the inner pipe.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
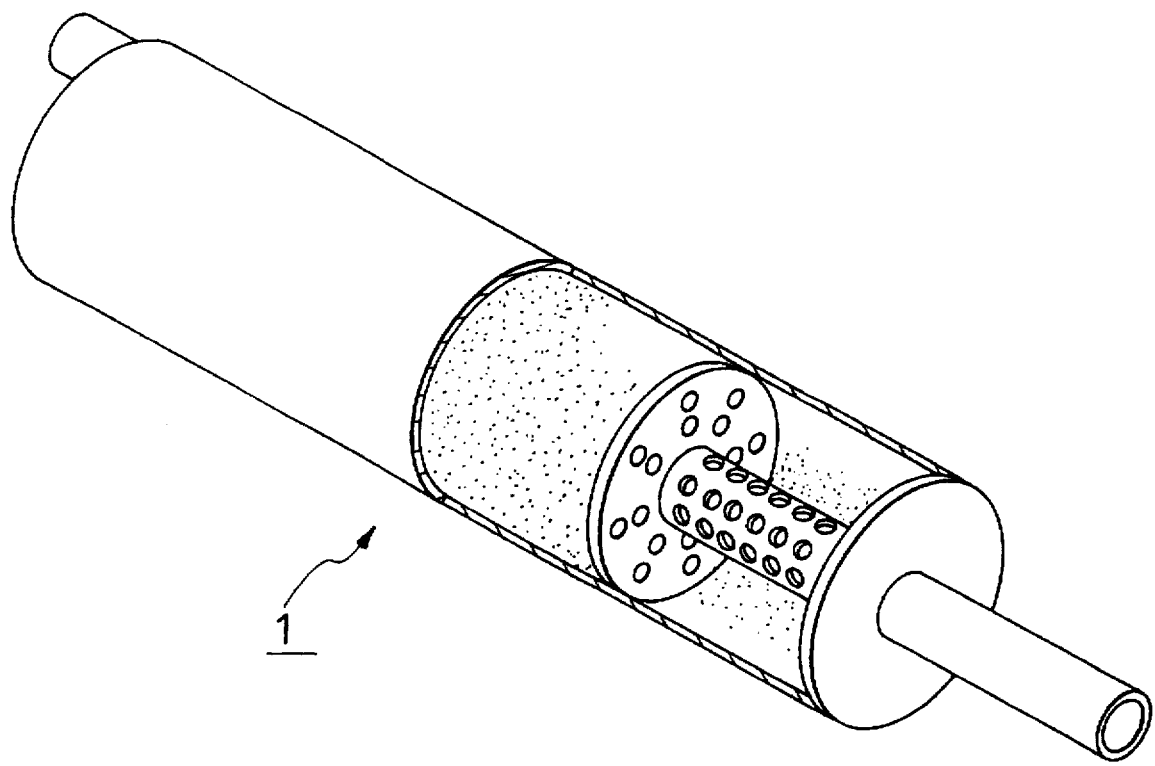
FIG. 1 illustrates a conventional assembly of an exhaust pipe unit and a muffling device.
Figure 2:
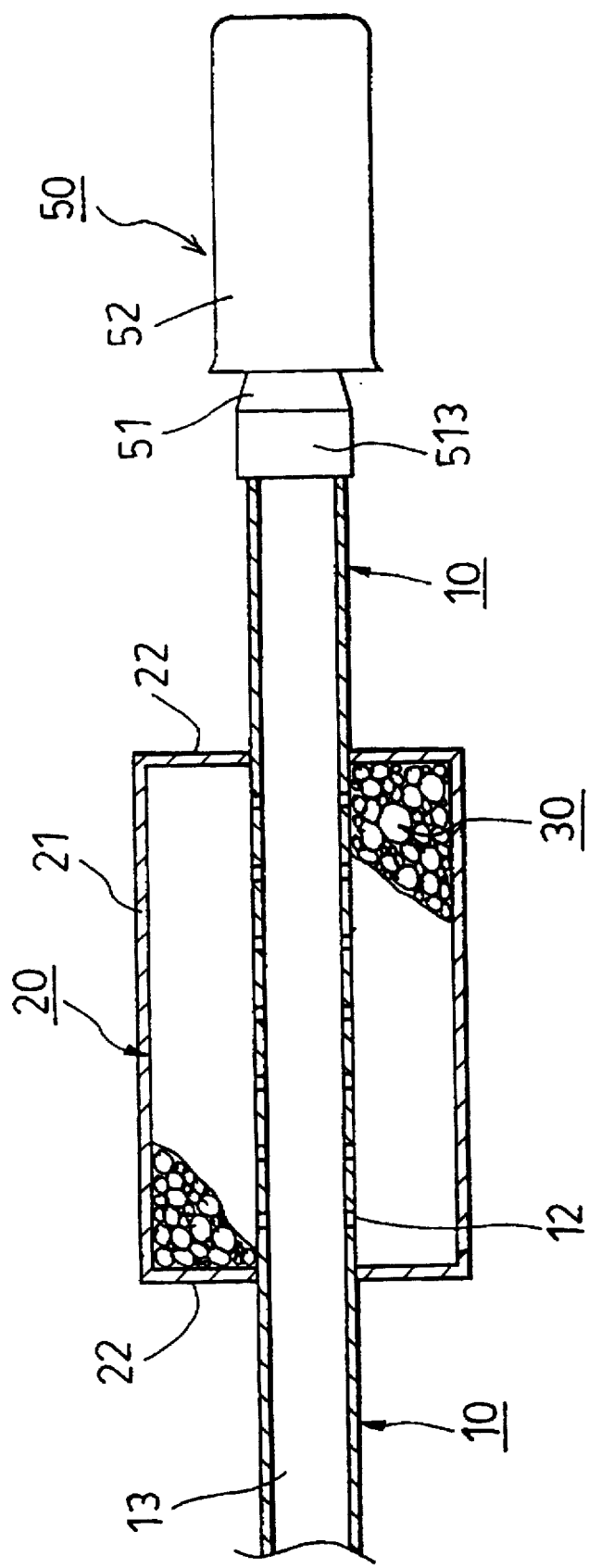
FIG. 2 illustrates an assembly of an exhaust pipe unit and a muffling device according to a first embodiment of this invention.

Referring to FIG. 2, an assembly according to a first embodiment of this invention includes a circular exhaust pipe unit 10 has a porous gas expanding section with a plurality of openings 12 formed through a wall thereof so that the exhaust gas can flow through the internal space 13 of the pipe unit 10. A muffling device includes a muffler unit 20 and a tailpipe unit 50 consisting of an inner pipe 51 and an outer pipe 52 sleeved on the inner pipe 51. The inner pipe 51 has a sleeve portion 513 sleeved tightly on the tail end portion of the exhaust pipe unit 10. The muffler unit 20 includes a cylindrical outer housing 21 with two end walls 22. The outer housing 21 and the exhaust pipe unit 10 define therebetween a gas expanding space which is filled with a filtering material 30, such as active carbon and active carbon fiber. The exhaust pipe unit 10 extends through the central openings of the end walls 22 of the muffler unit 20.

Figure 10:
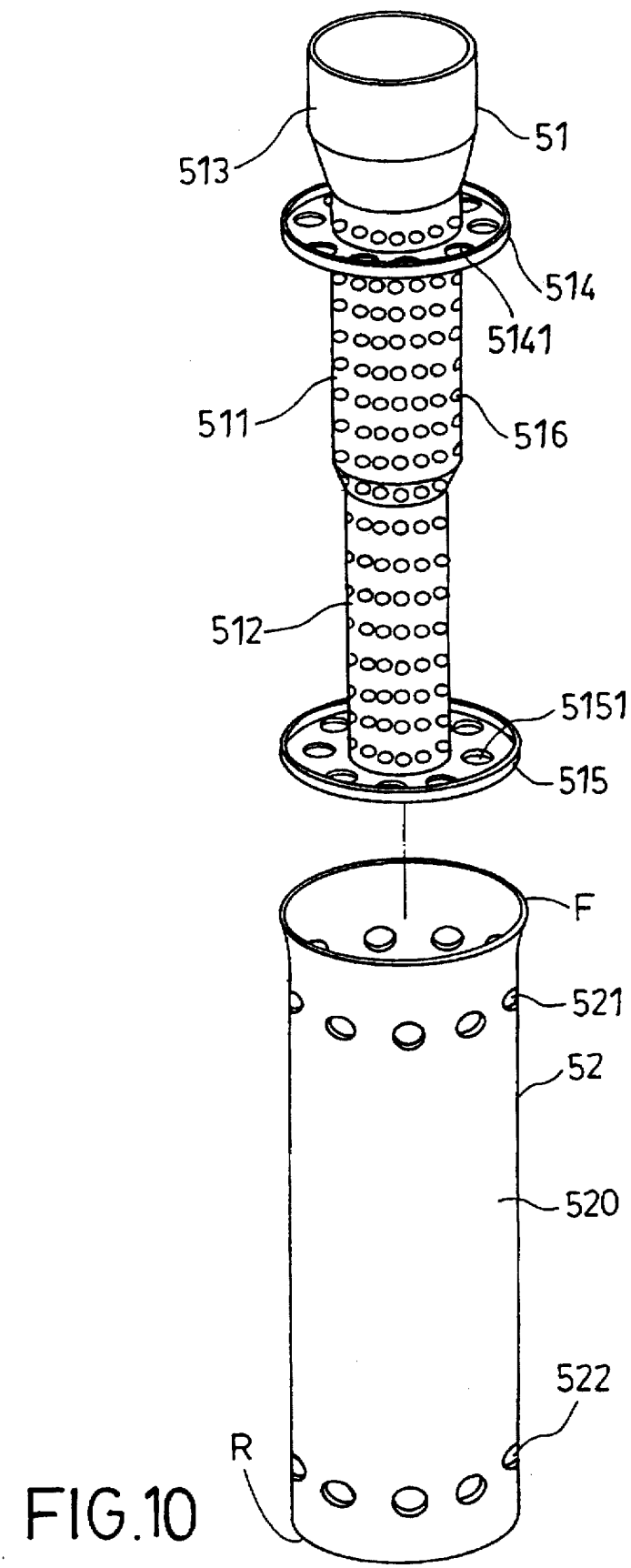
FIG. 10 is an exploded view showing the tailpipe unit of the assembly of an exhaust pipe unit and a muffling device according to the first embodiment of this invention.
Figure 11:
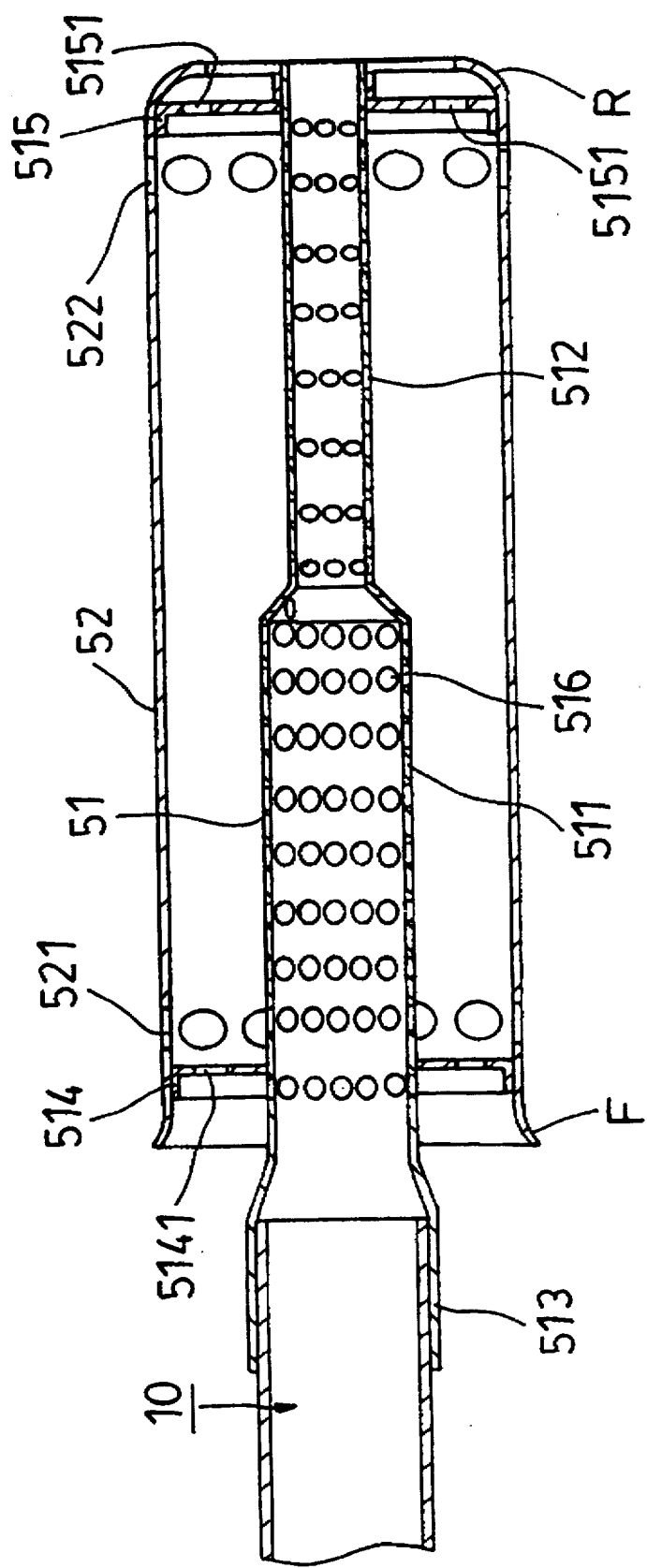
FIG. 11 illustrates the tailpipe unit of the assembly of an exhaust pipe unit and a muffling device according to the first embodiment of this invention.

As best shown in FIGS. 10 and 11, the inner pipe 51 of the tailpipe unit 50 includes a porous large-diameter pipe section 511, a porous small-diameter pipe section 512 being of a diameter smaller than that of the large-diameter pipe section 511 and having a front end coupled with the rear end of the large-diameter pipe section 511, and a sleeve portion 513 having an open front end sleeved on the tail end portion of the exhaust pipe unit 10, and a rear end coupled with the front end of the large-diameter pipe section 511. The pipe sections 511 and 512 have a plurality of openings 516 formed through the total length thereof. A porous front positioning ring 514 is sleeved fixedly on the large-diameter pipe section 511 and has a plurality of openings 5141 formed therethrough. A porous rear positioning ring 515 is sleeved fixedly on the rear end of the small-diameter pipe section 512 and has a plurality of opening 5151 formed therethrough. The front positioning ring 514 has an outer diameter the same as that of the rear positioning ring 515.

The outer pipe 52 of the tailpipe unit 50 has a circular tubular middle portion 520 (see FIG. 10) having an inner diameter slightly smaller than the outer diameter of the front and rear positioning rings 514, 515, and an outwardly diverging front end portion (F) facilitating insertion of the front and rear positioning rings 514, 515 into the outer pipe 52 in assembly of the inner and outer pipes 51, 52. The outer pipe 52 further has an outwardly converging rear end portion (R) having a minimum inner diameter smaller than the outer diameter of the rear positioning plate 515 so as to prevent removal of the inner pipe 51 from the outer pipe 52 through the rear end of the outer pipe 52. A plurality of air inlets 521 is formed through a wall of the outer pipe 51 near the front end portion of the outer pipe 51. A plurality of mixed-gas outlets 522 formed through a wall of the outer pipe 52 near the rear end portion of the outer pipe 52. Accordingly, air can enter into a space between the outer and inner pipes 51, 52 through the openings 5141 of the front positioning ring 514 of the inner pipe 51 and the air inlets 521 of the outer pipe 52. Exhaust gas can expand into the space between the inner and outer pipes 51, 52 through the openings 516 of the large-diameter pipe section 511 and the small-diameter pipe section 512 of the inner pipe 51.

Figure 3:
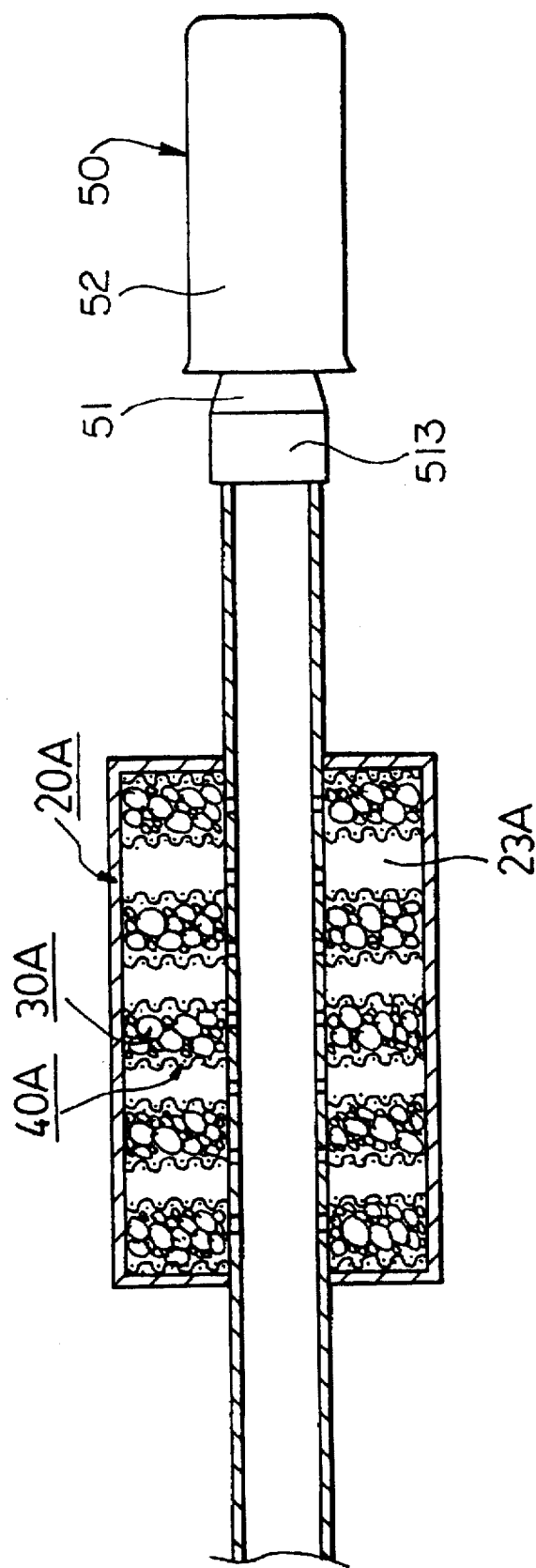
FIG. 3 illustrates an assembly of an exhaust pipe unit and a muffling device according to a second embodiment of this invention.

The location of the filtering material 30 in the outer housing 21 may be changed to the arrangement of FIG. 3, in which the muffler unit 20A includes a plurality of annular filter net packages 40A each of which is constituted by a metal wire and each of which is filled with the filtering material 40A to form a ring structure having a thickness. The ring structures are located within the gas expanding space in the muffler unit 20A and are axially spaced apart from each other.

Figure 4:
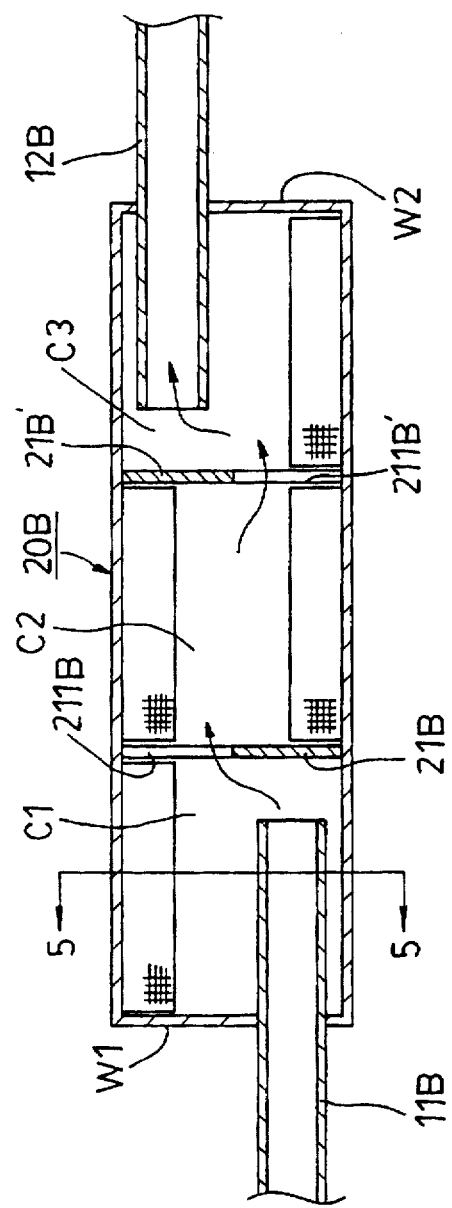
FIG. 4 illustrates an assembly of an exhaust pipe unit and a muffling device according to a third embodiment of this invention.
Figure 5:
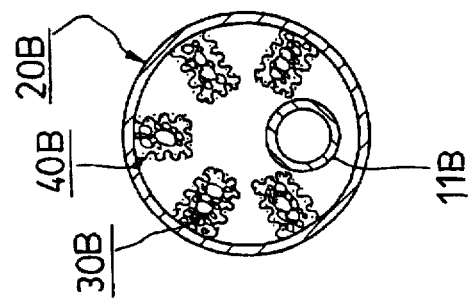
FIG. 5 is a sectional view taken along Line 5—5 in FIG. 4, which illustrates the arrangement of the filtering material in the assembly of an exhaust pipe unit and a muffling device according to the third embodiment of this invention.

FIGS. 4 and 5 show a third embodiment of the assembly of this invention. As illustrated, the assembly includes an exhaust pipe unit which has a circular upstream pipe portion 11B with an outlet end, and a circular downstream pipe portion 12B with an inlet end spaced apart from the outlet end of the upstream pipe portion 11B. The outer housing of the muffler unit 20B is cylindrical and includes an upstream end wall W1 formed through a peripheral portion thereof with an opening through which the upstream pipe portion 11B extends, and a downstream end wall W2 formed through a peripheral portion thereof with an opening through which the downstream pipe portion 12B extends. A circular upstream partition 21B is fixed in the outer housing of the muffler unit 20B near the outlet end of the upstream pipe portion 11B. A circular downstream partition 21B' is fixed in the outer housing of the muffler unit 20B near the inlet end of the downstream pipe portion 12B. The upstream and downstream partitions 21B, 21B' are located between the upstream and downstream pipe portions 11B, 12B so as to divide the gas expanding space of the muffler unit 20B into an upstream chamber C1, a middle chamber C2 and a downstream chamber C3. The upstream chamber C1 is located between the upstream end wall W1 and the upstream partition 21B. The middle chamber C2 is located between the upstream and downstream partitions 21B, 21B'. The downstream chamber C3 is located between the downstream partition 21B' and the downstream end wall W2. The openings of the upstream and downstream end walls W1, W2 are deflected from each other. The upstream partition 21B is formed therethrough with an opening 211B aligned with the opening of the downstream end wall W2. The downstream partition 21B' is formed therethrough with an opening 211B' aligned with the opening of the upstream end wall W1. Exhaust gas can flow from the outlet end of the upstream pipe portion 1lb to the inlet end of the downstream pipe portion 12B through the openings 211B, 211B' of the upstream and downstream partitions 21B, 21B' along a flow line having three turns. As best shown in FIG. 5, the muffler unit 20B includes a plurality of circumferentially spaced-apart filter net packages 40B each of which is constituted by a metal wire and each of which is filled with said filtering material 30B.

Figure 6:
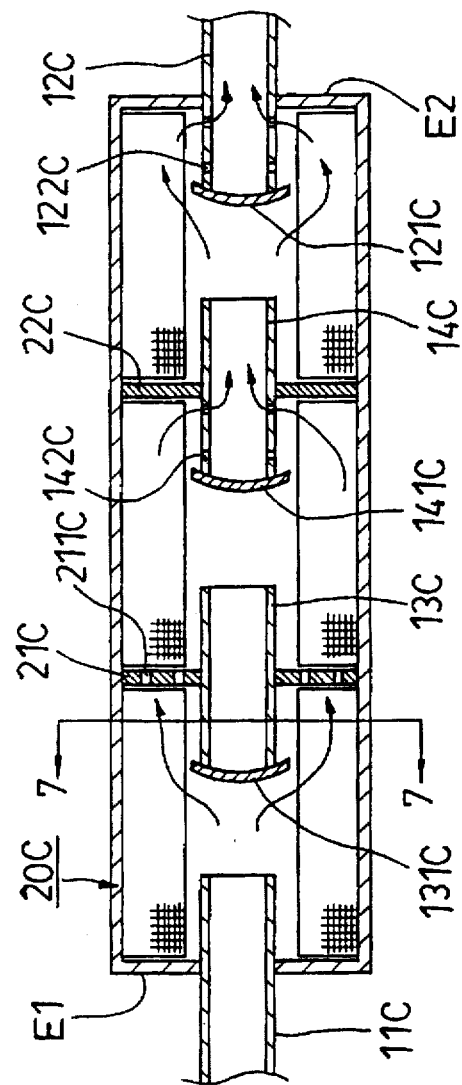
FIG. 6 illustrates an assembly of an exhaust pipe unit and a muffling device according to a fourth embodiment of this invention.
Figure 7:
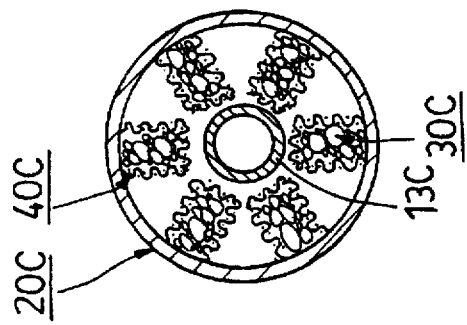
FIG. 7 is a sectional view taken along Line 7—7 in FIG. 6, which illustrates the arrangement of the filtering material in the assembly of an exhaust pipe unit and a muffling device according to the fourth embodiment of this invention.

FIGS. 6 and 7 shows the fourth embodiment of the assembly of this invention. As illustrated, the assembly includes an exhaust pipe unit which has a circular upstream pipe portion 11C with an outlet end, a circular downstream pipe portion 12C with a closed upstream end 121C, a circular first gas-guiding pipe portion 13C located at the downstream of the upstream pipe portion 11C in a spaced-apart relationship and provided with a closed upstream end 131C, and a second circular gas-guiding pipe portion 14C located at the downstream of the first gas-guiding pipe portion 13C and at the upstream of the downstream pipe portion 12C in a spaced-apart relationship and provided with a closed upstream end 141C. All of the upstream pipe portion 11C, the downstream pipe portion 12C, and the first and second gas-guiding pipe portions 13C, 14C are arranged in line with each other. The muffler unit 20C includes a circular upstream end wall E1 formed through a central opening thereof with an opening through which the upstream pipe portion extends 11C, and a circular downstream end wall E2 formed through a central opening thereof with an opening through which the downstream pipe portion 12C extends. A first partition ring 21C is fixed in the outer housing of the muffler unit 20C and sleeved fixedly on the first gas-guiding pipe portion 13C. A second partition ring 22C is fixed in the outer housing of the muffler unit 20C and sleeved fixedly on the second gas-guiding pipe portion 14C. The first partition ring 21C has a plurality of openings 211C formed therethrough so as to permit exhaust gas to flow therethrough. The second gas-guiding pipe portion 14C has a closed upstream end 141C and a plurality of openings 142C formed through a wall thereof at the upstream of the second partition ring to 22C. The downstream pipe portion 12C has a plurality of openings 122C formed through the portion of a wall thereof which is located in the outer housing of the muffler unit 20C. Exhaust gas can flow from the outlet end of the upstream pipe portion 11C into the downstream pipe portion 12C through the openings 211C of the first partition ring 21C, the openings 142C of the second gas-guiding pipe portion 14C, and the openings 122C of the downstream pipe portion 12C. As best shown in FIG. 7, the muffler unit 20C includes a plurality of circumferentially spaced-apart filter net packages 40C each of which is constituted by a metal wire and each of which is filled with said filtering material 30C.

Figure 8:
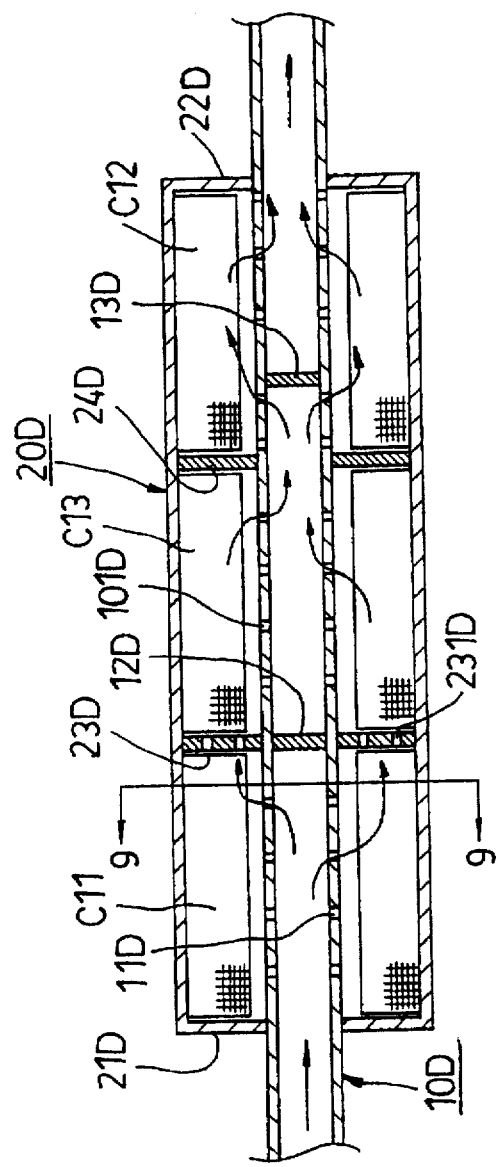
FIG. 8 illustrates an assembly of an exhaust pipe unit and a muffling device according to a fifth embodiment of this invention.
Figure 9:
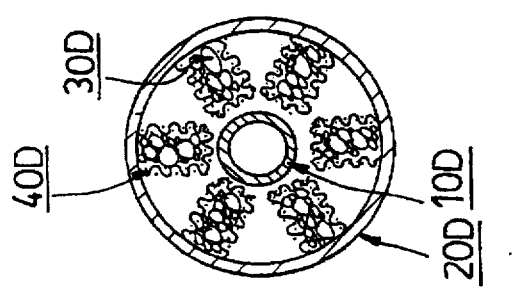
FIG. 9 is a sectional view taken along Line 9—9 in FIG. 8, which illustrates the arrangement of the filtering material in the assembly of an exhaust pipe unit and a muffling device according to the fifth embodiment of this invention.

FIGS. 8 and 9 show a fifth embodiment of the assembly of this invention. As illustrated, the assembly includes an exhaust pipe unit which has a tubular gas expanding section 10D formed through the total length of a wall thereof with a plurality of openings 101D. The muffler unit 20D includes an upstream end wall 21D having an opening formed through the center thereof, and a downstream end wall 22D having an opening formed through the center thereof so as to permit the tubular gas expanding section 10D of the exhaust pipe unit extends therethrough. A first partition ring 23D is fixed in the outer housing of the muffler unit 20D and is sleeved fixedly on the gas expanding section 10D so as to define an upstream chamber C11 between the upstream end wall 21D and the first partition ring 23D. A second partition ring 24D is fixed in the outer housing of the muffler unit 20D and is sleeved fixedly on the gas expanding section 10D between the first partition ring 23D and the downstream end wall 22D so as to define a downstream chamber C12 between the second partition ring 24D and the downstream end wall 22D. A first seal disc 12D is fitted fixedly within the gas expanding section 10D of the exhaust pipe unit inside the first partition ring 23D. A second seal disc 13D is fitted fixedly within the gas expanding section 10D of the exhaust pipe unit at the downstream of the second partition ring 24D. The first and second partition rings 23D, 24D define a middle chamber C13 therebetween. The first partition ring 23D has a plurality of openings 231D formed therethrough. Exhaust gas can advance along the following flow paths:

(1) path 1 of flow from the gas expanding section 10D of the exhaust pipe unit into the upstream chamber C11 of the muffler unit 20D via the openings 101D of the exhaust pipe unit which are located at the upstream of the first seal disc 12D, (2) path 2 of flow from the upstream chamber C11 of the muffler unit 20D into the middle chamber C13 of the muffler unit 20D via the openings 231D of the first partition ring 23D, (3) path 3 of flow from the middle chamber C13 of the muffler unit 20D into the gas expanding section 10D of the exhaust pipe unit via the openings 101D of the exhaust pipe unit which are located between the first and second partition rings 23D, 24D, (4) path 4 of flow from the gas expanding section 10D of the exhaust pipe unit into the downstream chamber C12 of the muffler unit 20D via the openings 101D of the exhaust pipe unit which are located between the second partition ring 24D and the second seal disc 13D, and (5) path 5 of flow from the downstream chamber C12 of the muffler unit 20D into the gas expanding section 10D of the exhaust pipe unit via the openings 101D of the exhaust pipe unit which are located at the downstream of the second seal disc 13D. As best shown in FIG. 9, the muffler unit 20d includes a plurality of circumferentially spaced-apart filter net packages 40D each of which is constituted by a metal wire and each of which is filled with said filtering material 30D.

With this invention thus explained, it is apparent that numerous modifications and variations can be made without departing from the scope and spirit of this invention. It is therefore intended that this invention be limited only as indicated in the appended claims.

We claim:

1. In an assembly comprising an exhaust pipe unit and a muffler device, said exhaust pipe unit having at least one gas expanding section, said muffler device defining a gas expanding space in communication with said gas expanding section of said exhaust pipe unit, wherein the improvement comprises:

a filtering material within said gas expanding space of said muffler device so as to filter exhaust gas which flows through said gas expanding space;

a tail end portion of said exhaust pipe unit; and a tailpipe unit including:

an inner pipe including a sleeve portion having an open front end sleeved on said tail end portion of said exhaust pipe unit and a rear end, a porous large-diameter pipe section having a front end coupled with said rear end of said sleeve portion and a rear end, a porous small-diameter pipe section being of a diameter smaller than that of said large-diameter pipe section and having a front end coupled with said rear end of said large-diameter pipe section and an open rear end, a porous front positioning ring sleeved fixedly on said large-diameter pipe section and having a plurality of openings formed therethrough, and a porous rear positioning ring sleeved fixedly on the rear end of said small-diameter pipe section and having a plurality of opening formed therethrough, said front positioning ring having an outer diameter the same as that of said rear positioning ring; and an outer pipe including a circular tubular middle portion having an inner diameter slightly smaller than the outer diameter of said front and rear positioning rings, an outwardly diverging front end portion facilitating insertion of said front and rear positioning rings into said outer pipe in assembly of said inner and outer pipes, and outwardly converging rear end portion having a minimum inner diameter smaller than the outer diameter of said rear positioning plate so as to prevent removal of said inner pipe from said outer pipe through a rear end of said outer pipe, a plurality of air inlets formed through a wall of said outer pipe near said front end portion of said outer pipe, and a plurality of mixed-gas outlets formed through a wall of said outer pipe near said rear end portion of said outer pipe, air being capable of entering into a space between said outer and inner pipes through said openings of said front positioning ring of said inner pipe and said air inlets of said outer pipe, exhaust gas being capable of expanding into the space between said inner and outer pipes through said openings of said large-diameter pipe section and said small diameter pipe section of said inner pipe, mixture of said exhaust gas and air being capable of flowing out of the space between said inner and outer pipes through openings of said rear positioning ring and said mixed-gas outlets of said outer pipe, remaining exhaust gas in said small-diameter pipe section of said inner pipe being capable of flowing therefrom through the rear end of said inner pipe.

2. An assembly as claimed in claim 1, wherein said muffler device surrounds said gas expanding section of said exhausts pipe unit, whereby said gas expanding space is annular, and includes a plurality of annular filter net packages each of which is constituted by metal wire filled with said filtering material, said annular filter net packages transversely crossing said gas expanding space and being axially spaced apart from each other.

3. An assembly as claimed in claim 1, wherein said muffler device includes a plurality of circumferentially spaced-apart filter net packages each of which is constituted by metal wire filled with said filtering material.

4. An assembly as claimed in claim 1, wherein said muffler device includes a gas flow path formed therein which has a plurality of turns.

5. An assembly as claimed in claim 4, wherein said gas expanding section of said exhaust pipe unit includes a circular upstream pipe portion with an outlet end, and a circular downstream pipe portion with an inlet end spaced apart from said outlet end of said upstream pipe portion; and said muffler device has an outer housing surrounding said gas expanding section of said exhaust pipe unit and defining said gas expanding space, said outer housing being cylindrical and including an upstream end wall formed through a peripheral portion thereof with an opening through which said upstream pipe portion extends, a downstream end wall formed through a peripheral portion thereof with an opening through which said downstream pipe portion extends, a circular upstream partition fixed in said outer housing near said outlet end of said upstream pipe portion, and a circular downstream partition fixed in said outer housing near said inlet end of said downstream pipe portion, said upstream and downstream partitions being located between said upstream and downstream pipe portions so as to divide said gas expanding space into an upstream chamber, a middle chamber and a downstream chamber, said upstream chamber being located between said upstream end wall and said upstream partition, said middle chamber being located between said upstream and downstream partitions, said downstream chamber being located between said downstream partition and said downstream end wall, said openings of said upstream and downstream end walls being deflected from each other, said upstream partition being formed therethrough with an opening aligned with said opening of said downstream end wall, said downstream partition being formed therethrough with an opening aligned with said opening of said upstream end wall, whereby exhaust gas can flow from said outlet end of said upstream pipe portion to said inlet end of said downstream pipe portion through said openings of said upstream and downstream partitions along a flow line having three turns.

6. An assembly as claimed in claim 4, wherein said exhaust pipe unit has a circular upstream pipe portion with an outlet end, a circular first gas-guiding pipe portion located at downstream of said upstream pipe portion in a spaced-apart relationship and provided with a closed upstream end, a second circular gas-guiding pipe portion located at downstream of said first gas-guiding pipe portion and at upstream of said downstream pipe portion in a spaced-apart relationship and provided with a closed upstream end, and a circular downstream pipe portion with a closed upstream end, all of said upstream pipe portion, said first and second gas-guiding pipe portions, and said downstream pipe portion being arranged in line with each other, said muffler device including a circular upstream end wall formed through a central opening thereof with an opening through which said upstream pipe portion extends, a circular downstream end wall formed through a central opening thereof with an opening through which said downstream pipe portion extends, a first partition ring fixed in an outer housing of said muffler device that surrounds said gas expanding section of said exhaust pipe unit and defines said gas expanding space and sleeved fixedly on said first gas-guiding pipe portion, a second partition ring fixed in said outer housing and sleeved fixedly on said second gas-guiding pipe portion, said first partition ring having a plurality of openings formed therethrough so as to permit exhaust gas to flow therethrough, said second gas-guiding pipe portion having a plurality of openings formed through a wall thereof at upstream of said second partition ring, said downstream pipe portion having a plurality of openings formed through a portion of a wall thereof which is located in said outer housing, whereby exhaust gas can flow from said outlet end of said upstream pipe portion into said downstream pipe portion through said openings of said first partition ring, said openings of said second gas-guiding pipe portion and said openings of said downstream pipe portion.

7. An assembly as claimed in claim 4, wherein:

said muffler device has an outer housing surrounding said gas expanding section of said exhaust pipe unit and defining said gas expanding space; and said gas expanding section of said exhaust pipe unit is tubular and formed along a total length of said muffler device with a plurality of openings, said muffler device further including an upstream end wall having an opening formed through a center thereof, a downstream end wall having an opening formed through a center thereof for said tubular gas expanding section of said exhaust pipe unit to extend therethrough, a first partition ring fixed in said outer housing and sleeved fixedly on said gas expanding section so as to define an upstream chamber between said upstream end wall and said first partition ring, a second partition ring fixed in said outer housing and sleeved fixedly on said gas expanding section between said first partition ring and said downstream end wall so as to define a downstream chamber between said second partition ring and said downstream end wall, a first seal disc fitted fixedly within said gas expanding section of said exhaust pipe unit inside said first partition ring, and a second seal disc fitted fixedly within said gas expanding section of said exhausts pipe unit at downstream of said second partition ring, said first and second partition rings defining a middle chamber therebetween, said first partition ring having a plurality of openings formed therethrough, whereby exhausts gas is capable of flowing from said exhaust pipe unit into said upstream chamber via said openings of said exhaust pipe unit which are located upstream of said first seal disc, of flowing from said upstream chamber into said middle chamber via said openings of said first partition ring, of flowing from said middle chamber into said exhaust pipe unit via said openings of said exhaust pipe unit which are located between said first and second partition rings, of flowing from said exhaust pipe unit into said downstream chamber via said openings of said exhaust pipe unit which are located between said second partition ring and said second seal disc, and of flowing from said downstream chamber into said exhaust pipe unit via said openings of said exhaust pipe unit which are located downstream of said second seal disc.

8. An assembly as claimed in claim 1 wherein said filtering material is active carbon.

9. An assembly as claimed in claim 1, wherein said filtering material is active carbon fiber.

* * * * *